3,099,997
PRESSURE RELIEF VALVE
Kenneth K. Kroffke, Parma, Ohio, assignor to Airmatic Valve, Inc., Cleveland, Ohio, a corporation of Ohio
Filed Apr. 5, 1962, Ser. No. 185,344
1 Claim. (Cl. 137—493.8)

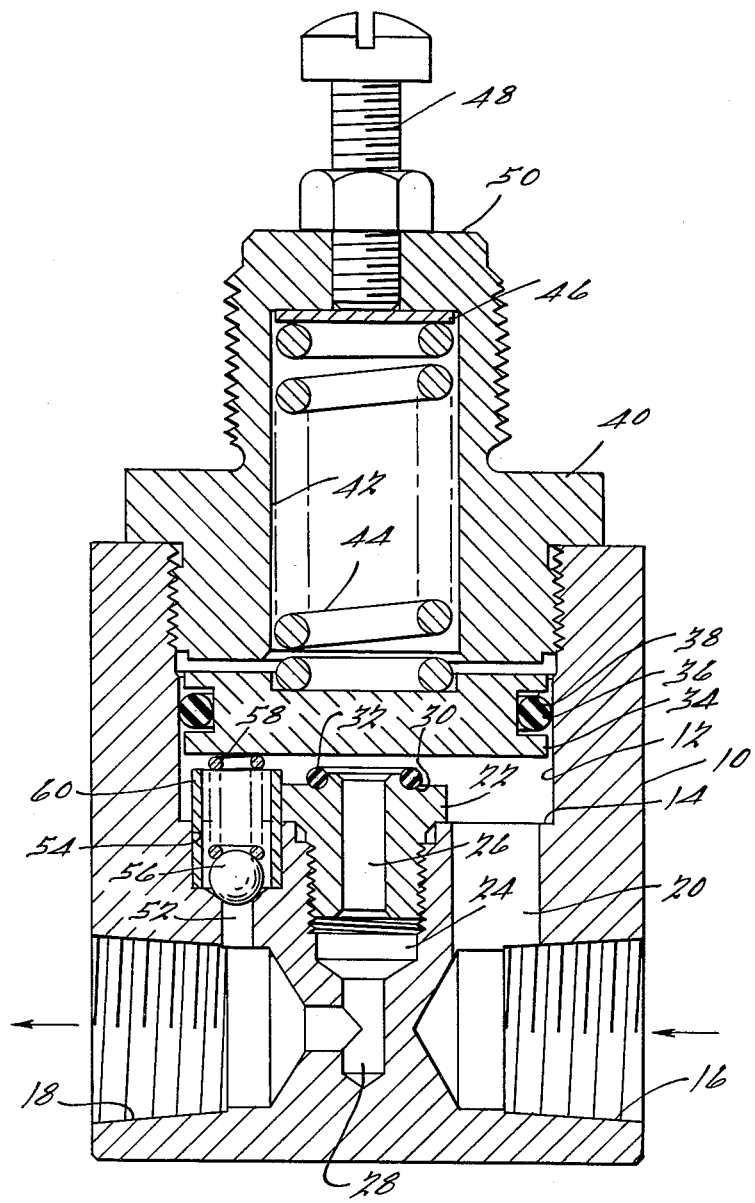

This invention relates to pressure relief valves and has particular reference to a pressure relief valve having a check valve incorporated therein to permit free flow in the reverse direction through the valve even though the pressure relief valve remains closed. The pressure relief valve of this invention is also characterized by the fact that the pressure fluid to be controlled reacts against a relatively large diameter piston which will open the valve when a predetermined pressure is reached, the large area of the piston providing a more positive action than in other types of relief valves heretofore employed. In addition, the construction of the present valve is such as to provide a very compact valve structure of relatively small dimensions while at the same time providing a relatively large area on the movable valve member against which the pressure fluid reacts.

A principal object of the invention is to provide a new and improved pressure relief valve.

Another object of the invention is to provide a combination pressure relief valve and check valve.

Other and further objects of the invention will be apparent from the following description and claim and may be understood by reference to the accompanying drawing, which by way of illustration shows a preferred embodiment of the invention and what I now consider to be the best mode of applying the principles thereof. Other embodiments of the invention may be used without departing from the scope of the present invention as set forth in the appended claim.

In the drawing there is shown a valve body 10 provided with a socket or bore 12 therein terminating in an end wall 14. The valve body is also provided with an inlet port 16 and an outlet port 18. A passage 20 leads from the inlet port 16 to the bore 12. A valve seat member 22 is threaded into a socket 24 in the valve body 10 and has a central bore 26 communicating with socket 24 and a passage 28 in the valve body 10 with which the outlet port 18 is in communication.

The valve seat member 22 has an annular groove 30 on its upper surface around the bore 26 therein to receive an O-ring 32 which forms a valve seat around the central passage 26.

A piston 34 is reciprocable within the bore 12 and is provided with an O-ring 36 retained within an annular groove 38 in the periphery of the piston to sealingly engage the bore 12. An end cap 40 is threaded into the outer end of the bore 12 and is provided with an internal cavity 42 containing a spring 44 which is confined between the upper surface of the piston 34 and an annular disc 46, which is engaged by an adjusting screw 48 threaded into the end wall 50 of the end cap 40. The force of the spring may be adjusted by the adjusting screw 48 so that the piston 34 normally engages its valve seat 32 to close the communication between the inlet 16 and the outlet 18. When the pressure in the inlet 16 exceeds a predetermined pressure, the piston 34 will disengage the valve seat 32 to open the valve and relieve the pressure in the inlet 16. It is to be noted that the diameter of the piston 34 is substantially greater than the diameter of the valve seat 32 so that the inlet pressure is applied against a relatively large area on the underside of the piston 34 to provide a positive action of the piston in its opening movement.

A passage 52 communicates with the outlet port 18 and terminates in a socket 54 opening from the end wall 14 of the bore 12. A ball check 56 normally closes the passage 52 and is held in closed position by a spring 58 which is confined between the ball 56 and the underside of the piston 34. A tubular sleeve 60 is inserted into the socket 54 and forms a guide for the spring 58 to prevent the spring from becoming disengaged from the ball 56.

When the pressure relief valve is in its normally closed position with the piston 34 in engagement with the valve seat 32, communication between the inlet and outlet ports through the central passage 26 is prevented. However, it is frequently desirable to permit flow in a reverse direction from the outlet port back to the inlet. The check valve 56 will open against the force exerted by the spring 58 to allow a reverse flow from the outlet 18 back to the bore 12 and through passage 20 to the inlet port 16.

The construction and relationship of the pressure relief and check valve members described permits the use of a relatively large diameter valve member which is positive and quick acting and at the same time provides for a simple check valve which permits free flow in a reverse direction through the valve even though the pressure relief valve is closed.

While I have illustrated and described a preferred embodiment of my invention, it is understood that this is capable of modification, and I therefore do not wish to be limited to the precise details set forth but desire to avail myself of such changes and alterations as fall within the purview of the following claim.

I claim:

A pressure relief valve comprising a valve body having opposed inlet and outlet ports and a bore having an end wall, a valve seat member in said end wall having a passage coaxial with said bore and leading from said bore to said outlet port, a second passage parallel to said first passage but laterally offset therefrom and leading from said inlet port to said bore, an O-ring on said valve seat member around said first passage, a piston reciprocable in and sealingly engaging the wall of said bore and engageable with said O-ring to close communication between said inlet and outlet ports, a spring urging said piston into said engagement with said O-ring, a third passage in said valve body communicating with said outlet port and opening into said bore in spaced relation to said O-ring to provide for reverse flow from said outlet port to said inlet port when said piston is engaged with said O-ring, a valve seat in said third passage, a ball check valve engageable with said valve seat in said third passage for normally closing said third passage, and a spring confined between said ball check valve and the underside of said piston for urging said check valve into engagement with its valve seat.

References Cited in the file of this patent

UNITED STATES PATENTS

| 2,290,080 | Wahlmark | July 14, 1942 |
| 2,896,663 | Mena | July 28, 1959 |

FOREIGN PATENTS

| 149,213 | Australia | Nov. 27, 1952 |